US012320271B2

(12) United States Patent
Task

(10) Patent No.: US 12,320,271 B2
(45) Date of Patent: Jun. 3, 2025

(54) SLURRY BASED DIFFUSION COATINGS FOR BLADE UNDER PLATFORM OF INTERNALLY-COOLED COMPONENTS AND PROCESS THEREFOR

(71) Applicant: RTX Corporation, Farmington, CT (US)

(72) Inventor: Michael N. Task, Vernon, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/626,774

(22) Filed: Apr. 4, 2024

(65) Prior Publication Data

US 2024/0271531 A1 Aug. 15, 2024

Related U.S. Application Data

(62) Division of application No. 16/549,243, filed on Aug. 23, 2019, now Pat. No. 11,970,953.

(51) Int. Cl.
*F01D 5/14* (2006.01)
*C23C 24/10* (2006.01)

(52) U.S. Cl.
CPC .............. *F01D 5/14* (2013.01); *C23C 24/106* (2013.01); *F05D 2230/90* (2013.01); *F05D 2300/121* (2013.01); *F05D 2300/132* (2013.01)

(58) Field of Classification Search
CPC .. F01D 5/14; F05D 2230/90; F05D 2300/121; F05D 2300/132; C23C 24/106; C23C 10/02; C23C 10/30; C23C 10/32; C23C 10/38; C23C 10/48; C23C 10/58; C23C 10/60; C23C 28/021; C23C 28/023; C23C 28/02
See application file for complete search history.

(56) References Cited

U.S. PATENT DOCUMENTS 3,290,126 A * 12/1966 Monson .................. C23C 10/58 428/651
3,415,672 A 12/1968 Levinstein et al.
(Continued)

FOREIGN PATENT DOCUMENTS

CN 101473107 B 5/2012
CN 108456842 A 8/2018
(Continued)

OTHER PUBLICATIONS

JP 2002504628 A _ ProQuestDocuments—Sep. 8, 2024 (Year: 2002).*

(Continued)

*Primary Examiner* — David E Sosnowski
*Assistant Examiner* — Wayne A Lambert
(74) *Attorney, Agent, or Firm* — Bachman & LaPointe, P.C.

(57) ABSTRACT

A component includes a diffusion coating comprising an inter-diffusion zone between the diffusion coating and a substrate and a non-metallic inclusions zone adjacent to an outer surface of the diffusion coating. A method of coating a component includes applying an aluminizing slurry to a localized area of a component and applying a chromizing slurry to the localized area of the component subsequent to heat treating the aluminizing slurry.

9 Claims, 6 Drawing Sheets

(56) References Cited

U.S. PATENT DOCUMENTS

| | | | | |
|---|---|---|---|---|
| 3,556,744 | A * | 1/1971 | Berkley et al. | C22C 32/0026 428/651 |
| 3,801,353 | A | 4/1974 | Brill-Edwards | |
| 3,874,901 | A | 4/1975 | Rairden, III | |
| 3,953,193 | A * | 4/1976 | Bessen | C23C 4/067 75/253 |
| 4,142,023 | A * | 2/1979 | Bornstein | C23C 10/58 427/253 |
| 4,327,134 | A | 4/1982 | Baldi | |
| 4,526,814 | A | 7/1985 | Shankar et al. | |
| 4,820,362 | A | 4/1989 | Baldi | |
| 5,652,045 | A | 7/1997 | Nakamura et al. | |
| 5,824,205 | A * | 10/1998 | Foster | C25D 15/02 205/228 |
| 6,080,246 | A | 6/2000 | Wing | |
| 6,132,520 | A | 10/2000 | Schilbe et al. | |
| 6,435,835 | B1 | 8/2002 | Allen et al. | |
| 6,569,492 | B2 | 5/2003 | Fernihough et al. | |
| 7,467,924 | B2 | 12/2008 | Charbonneau et al. | |
| 7,749,569 | B2 | 7/2010 | Wilkins et al. | |
| 8,262,812 | B2 | 9/2012 | Helmick et al. | |
| 8,596,985 | B2 | 12/2013 | Walker et al. | |
| 9,518,325 | B2 * | 12/2016 | Bucci | C23C 28/021 |
| 9,850,563 | B2 | 12/2017 | D'Souza et al. | |
| 10,077,494 | B2 | 9/2018 | Lin et al. | |
| 10,364,490 | B2 | 7/2019 | Trczinski et al. | |
| 10,584,411 | B2 | 3/2020 | Livings et al. | |
| 2007/0184298 | A1 | 8/2007 | Ochiai et al. | |
| 2010/0151125 | A1 * | 6/2010 | Kool | C23C 10/32 427/226 |
| 2010/0260613 | A1 | 10/2010 | Cetel et al. | |
| 2011/0101619 | A1 * | 5/2011 | Fairbourn | C23C 10/12 420/583 |
| 2012/0164473 | A1 | 6/2012 | Taylor et al. | |
| 2015/0197841 | A1 | 7/2015 | Tang et al. | |
| 2015/0197842 | A1 | 7/2015 | Tang et al. | |
| 2016/0010472 | A1 | 1/2016 | Murphy et al. | |
| 2016/0017481 | A1 | 1/2016 | Livings et al. | |
| 2016/0108513 | A1 | 4/2016 | Task et al. | |
| 2016/0230263 | A1 | 8/2016 | Kool et al. | |
| 2018/0016672 | A1 | 1/2018 | Task | |
| 2018/0282854 | A1 | 10/2018 | Task et al. | |
| 2019/0284941 | A1 | 9/2019 | Task et al. | |

FOREIGN PATENT DOCUMENTS

| | | | | |
|---|---|---|---|---|
| EP | 0626934 | B1 | 5/1997 | |
| EP | 2975153 | A2 | 1/2016 | |
| EP | 3382055 | A1 | 10/2018 | |
| EP | 3540089 | A1 | 9/2019 | |
| FR | 2618797 | A1 * | 2/1989 | |
| JP | 2002504628 | A * | 2/2002 | |
| KR | 100305728 | B1 | 9/2001 | |
| WO | 8203027 | A1 | 9/1982 | |
| WO | WO-9407004 | A1 * | 3/1994 | C23C 10/26 |

OTHER PUBLICATIONS

Terence Bell, Learn About Refractory Metals, https://www.thoughtco.com/refractory-metals-2340170, 2022.

Superalloys a Primer and History, 2018.

Office Action dated Apr. 17, 2024 issued in corresponding European Application No. 20 192 493.3.

* cited by examiner

SLURRY BASED DIFFUSION COATINGS FOR BLADE UNDER PLATFORM OF INTERNALLY-COOLED COMPONENTS AND PROCESS THEREFOR

CROSS-REFERENCE TO RELATED APPLICATION

This application is a divisional of U.S. patent application Ser. No. 16/549,243, filed Aug. 23, 2019.

BACKGROUND

The present disclosure relates to coating and, more particularly, to slurry coating compositions in which the properties of the coating are tailored to resist local under platform conditions.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include airfoil cooling that may be accomplished by external film cooling, internal air impingement and forced convection either separately, or in combination.

Such gas path components are often coated due to deposit-induced hot corrosion as well as high temperature oxidation. Newer HPT blade designs utilize an overlay coating which may present challenges to provision of an adequate thickness in areas of the component which do not have clear line of site to the coating source. Stress corrosion cracking (SCC) may be a failure mode. In addition, peening of the overlay coating, which is required to achieve microstructural requirements, may introduce foreign object debris (FOD) risks from entrapped peen media within drilled cooling holes.

SUMMARY

A component according to one disclosed non-limiting embodiment of the present disclosure includes a diffusion coating on a localized area of the substrate comprising an inter-diffusion zone between the diffusion coating and the substrate and a non-metallic inclusions zone adjacent to an outer surface of the diffusion coating.

A further embodiment of any of the foregoing embodiments of the present disclosure includes that the diffusion coating is a Cr-enriched γ-Ni based layer with a Cr content of 20 wt. % minimum and Al content of 4 wt. % minimum between 1-3 mils (thousandth of an inch (0.0254-0.0762 mm)) thick.

A further embodiment of any of the foregoing embodiments of the present disclosure includes that the diffusion coating a Cr-enriched γ-Ni based layer with a Cr content of 20 wt. % minimum and Al content of 4 wt. % minimum and has a nominal thickness of 1.5 mils (thousandth of an inch (0.0381 mm)).

A further embodiment of any of the foregoing embodiments of the present disclosure includes that the substrate is manufactured of a superalloy.

A further embodiment of any of the foregoing embodiments of the present disclosure includes that the component is a rotor blade.

A further embodiment of any of the foregoing embodiments of the present disclosure includes that the localized area of the substrate is a platform of a rotor blade.

A further embodiment of any of the foregoing embodiments of the present disclosure includes that the localized area of the substrate is an under-platform of a rotor blade.

A rotor blade for a gas turbine engine according to one disclosed non-limiting embodiment of the present disclosure includes a platform that comprises a gas path side adjacent to the airfoil and a non-gas path side adjacent to the root; and a diffusion coating on the non-gas path side of the platform, the diffusion coating comprising a Cr-enriched γ-Ni based layer with a Cr content of 20 wt. % minimum and Al content of 4 wt. % minimum having an inter-diffusion zone between the diffusion coating and the platform and a non-metallic inclusions zone adjacent to an outer surface of the diffusion coating.

A further embodiment of any of the foregoing embodiments of the present disclosure includes that the rotor blade is manufactured of a superalloy.

A further embodiment of any of the foregoing embodiments of the present disclosure includes that the diffusion coating comprises a non-metallic inclusions zone adjacent to an outer surface of the diffusion coating.

A further embodiment of any of the foregoing embodiments of the present disclosure includes that the diffusion coating is between 1-3 mils (thousandth of an inch (0.0254-0.0762 mm)) thick.

A further embodiment of any of the foregoing embodiments of the present disclosure includes that the diffusion coating has a nominal thickness of 1.5 mils (thousandth of an inch (0.0381 mm)).

A method of coating a component according to one disclosed non-limiting embodiment of the present disclosure includes applying an aluminizing slurry to a localized area of a component; drying the aluminizing slurry; heat treating the aluminizing slurry; applying a chromizing slurry to the localized area of the component subsequent to heat treating the aluminizing slurry; drying the chromizing slurry; and heat treating the chromizing slurry.

A further embodiment of any of the foregoing embodiments of the present disclosure includes that the localized area is an under-platform area.

A further embodiment of any of the foregoing embodiments of the present disclosure includes a surface preparation subsequent to heat treating the aluminizing slurry.

A further embodiment of any of the foregoing embodiments of the present disclosure includes that the heat treating of the aluminizing slurry comprises heat treating for a length of time less than a length of time of the chromizing slurry.

A further embodiment of any of the foregoing embodiments of the present disclosure includes that the heat treating of the aluminizing slurry comprises heat treating in the range of 1900-2000 F for 2-5 hours.

A further embodiment of any of the foregoing embodiments of the present disclosure includes that the heat treating of the chromizing slurry comprises heat treating in the range of 1900-2000 F for 5-10 hours.

A further embodiment of any of the foregoing embodiments of the present disclosure includes that the heat treating of the aluminizing slurry comprises heat treating in the range of 1900-2000 F for 2-5 hours and heat treating of the chromizing slurry comprises heat treating in the range of 1900-2000 F for 5-10 hours.

A further embodiment of any of the foregoing embodiments of the present disclosure includes that the diffusion coating comprises a Cr-enriched γ-Ni based layer with a Cr content of 20 wt. % minimum and Al content of 4 wt. % minimum retaining, β-NiAl or γ'-Ni3Al from the initial aluminizing process between the γ-Ni layer and an interdiffusion zone.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
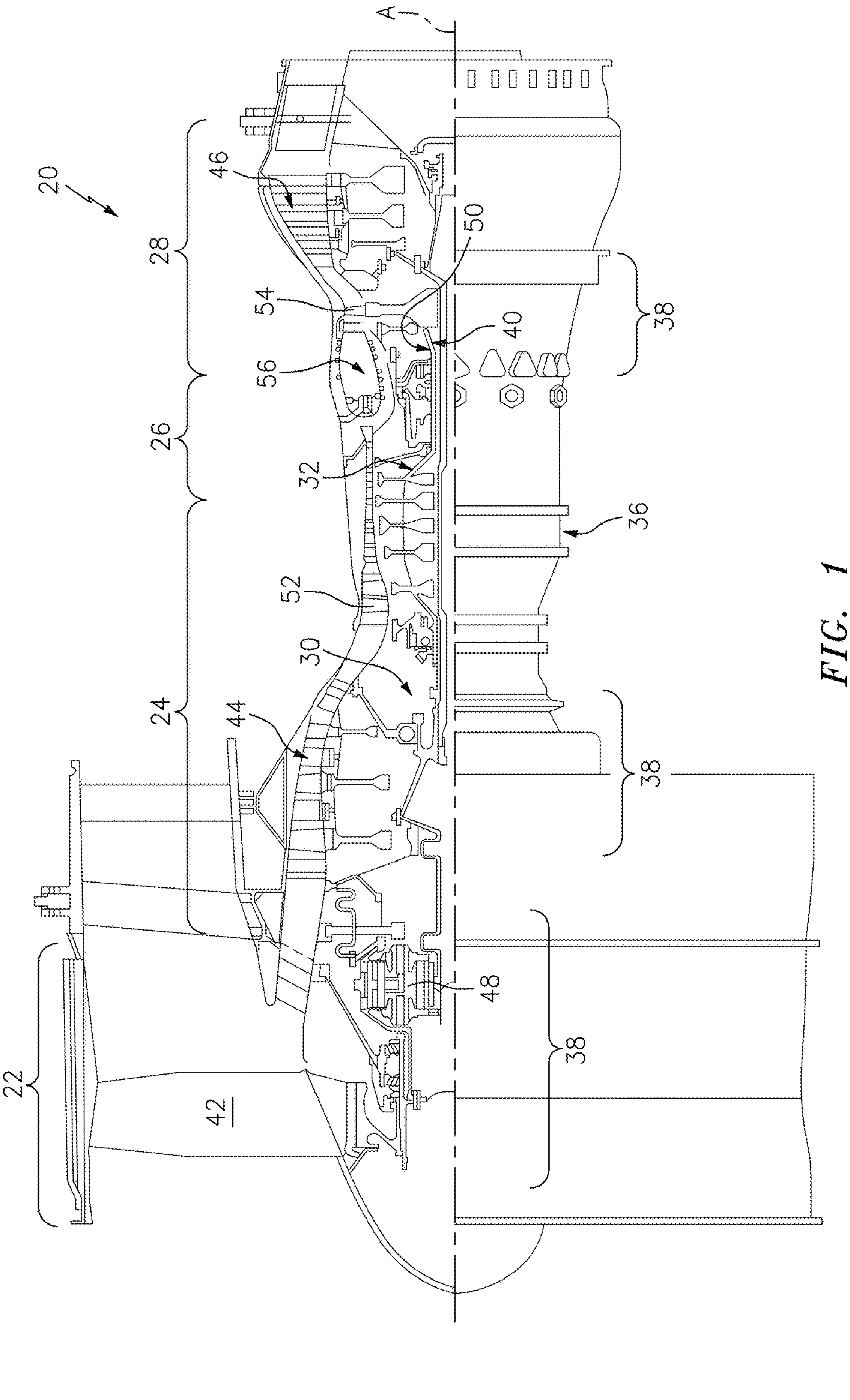
FIG. 1 is a schematic cross-section of an example gas turbine engine architecture.

FIG. 1 schematically illustrates a gas turbine engine 20. The exemplary gas turbine engine 20 is disclosed herein as a two-spool turbo fan that generally incorporates a fan section 22, a compressor section 24, a combustor section 26 and a turbine section 28. The fan section 22 drives air along a bypass flowpath and along a core flowpath for compression by the compressor section 24, communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engine architectures such as low bypass turbofans, turbojets, turboshafts, three-spool (plus fan) turbofans and other non-gas turbine components.

The engine 20 generally includes a low spool 30 and a high spool 32 mounted for rotation about an engine central longitudinal axis “A”. The low spool 30 generally includes an inner shaft 40 that interconnects a fan 42, a low pressure compressor (“LPC”) 44 and a low pressure turbine (“LPT”) 46. The inner shaft 40 drives the fan 42 directly, or through a geared architecture 48 at a lower speed than the low spool 30. An exemplary reduction transmission is an epicyclic transmission, namely a planetary or star gear system.

The high spool 32 includes an outer shaft 50 that interconnects a high pressure compressor (“HPC”) 52 and high pressure turbine (“HPT”) 54. A combustor 56 is arranged between the high pressure compressor 52 and the high pressure turbine 54. The inner shaft 40 and the outer shaft 50 are concentric and rotate the engine central longitudinal axis “A”, which is collinear with their longitudinal axes.

Core airflow is compressed by the LPC 44, then the HPC 52, mixed with the fuel and burned in the combustor 56, then expanded over the HPT 54, then the LPT 46. The turbines 54, 46 rotationally drive the respective high spool 32 and low spool 30 in response to the expansion. The main engine shafts 40, 50 are supported at a plurality of points by bearing structures 38 within the static structure 36.

Figure 2:
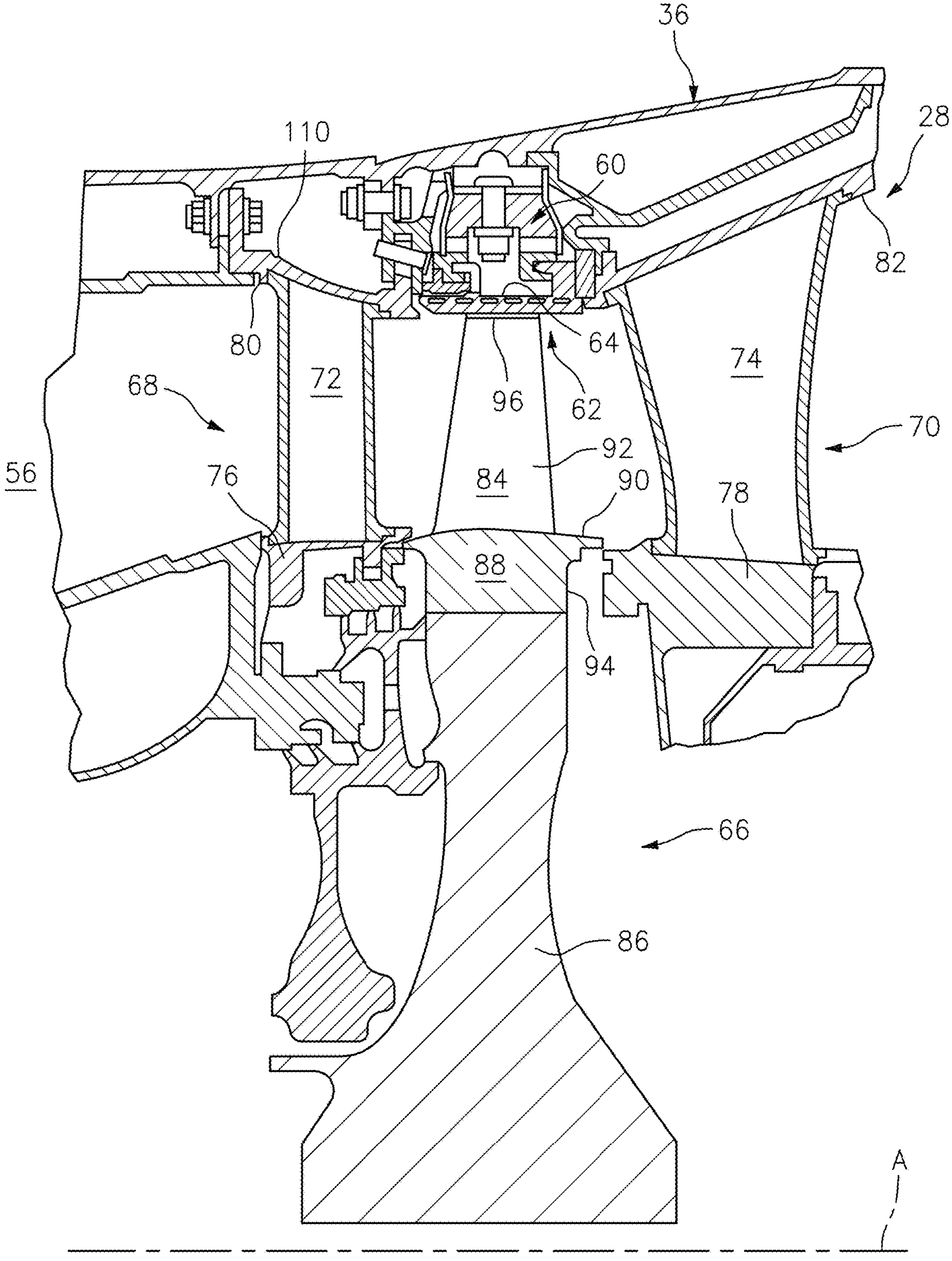
FIG. 2 is an enlarged schematic cross-section of an engine turbine section.

With reference to FIG. 2, an enlarged schematic view of a portion of the turbine section 28 is shown by way of example; however, other engine sections will also benefit herefrom. A shroud assembly 60 within the engine case structure 36 supports a blade outer air seal (BOAS) assembly 62 with a multiple of circumferentially distributed BOAS 64 proximate to a rotor assembly 66 (one schematically shown).

The shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36.

The rotor assembly 66 includes an array of blades 84 circumferentially disposed around a disk 86. Each blade 84 includes a root 88, a platform 90 and an airfoil 92 (also shown in FIG. 3). The blade roots 88 are received within a rim 94 of the disk 86 and the airfoils 92 extend radially outward such that a tip 96 of each airfoil 92 interfaces with the blade outer air seal (BOAS) assembly 62. The platform 90 includes a gas path side 124 adjacent to the airfoil 92 and a non-gas path side 122 adjacent to the root 88.

Figure 3:
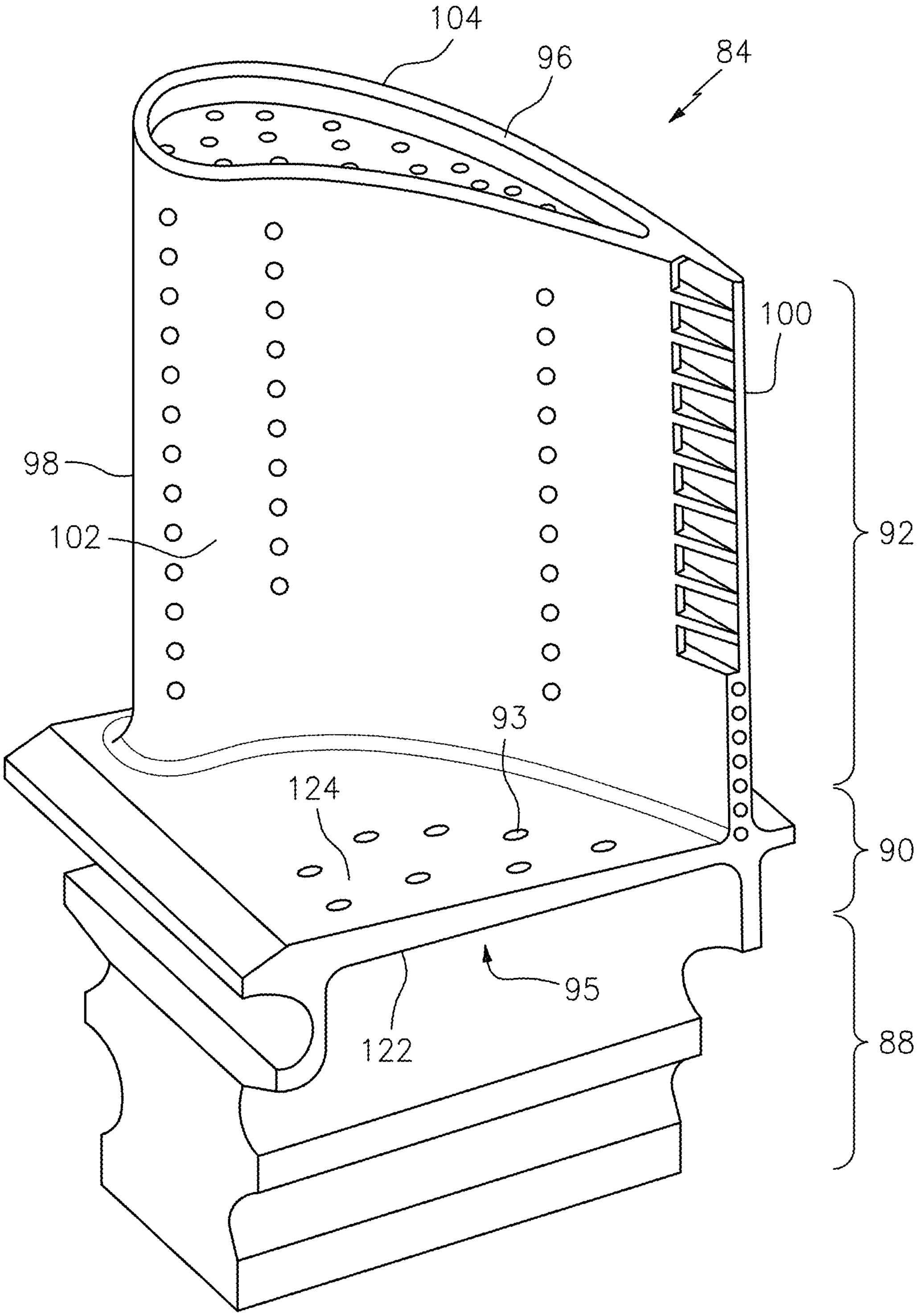
FIG. 3 is a perspective view of an airfoil as an example component for use with a coating method showing an example internal architecture.

With reference to FIG. 3, the platform 90 generally separates the root 88 and the airfoil 92 to define an inner boundary of the core gas path. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90.

Each blade 84 is typically manufactured of a nickel-base alloy, a nickel-base superalloy or other high temperature resistant substrate. A nickel-base alloy has more nickel than any other element, and a nickel-base superalloy is a nickel-base alloy that is strengthened by the precipitation of gamma prime or a related phase. In a still further example, the base alloy is a low-chromium superalloy, such as a superalloy having less than approximately 12% by weight chromium.

The external airfoil surface may be protected by a protective coating that overlies and contacts the external airfoil surface. Such coatings may be of the MCrAlX type. The terminology “MCrAlX” is a shorthand term of art for a variety of families of overlay protective layers that may be employed as environmental coatings or bond coats in thermal barrier coating systems. In this, and other forms, M refers to nickel, cobalt, iron, and combinations thereof. In some of these protective coatings, the chromium may be omitted. The X denotes elements such as hafnium, zirconium, yttrium, tantalum, rhenium, ruthenium, palladium, platinum, silicon, titanium, boron, carbon, and combinations thereof. Specific compositions are known in the art. Optionally, a ceramic layer overlies and contacts the protective layer. The ceramic layer is preferably yttria-stabilized zirconia, which is a zirconium oxide. Other operable ceramic materials may be used as well. Often, when there is no ceramic layer present, the protective layer is termed an “environmental coating.” When there is a ceramic layer present, the protective layer is often referred to as a “bond coat”.

Figure 4:
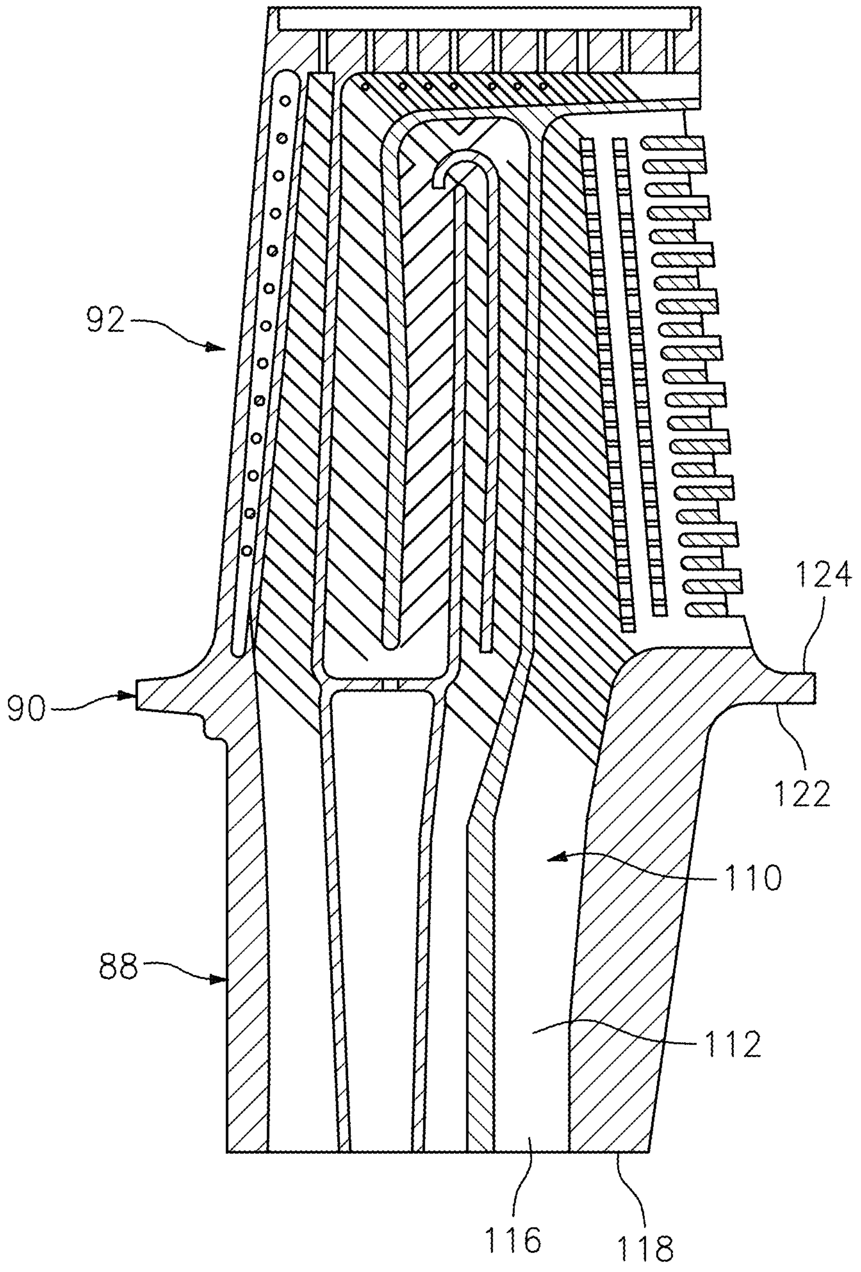
FIG. 4 is a sectional view of the airfoil of FIG. 3.

To resist the high temperature stress environment in the gas path of a turbine engine, each blade 84 may include an array of internal passageways 110 (FIG. 4). The array of internal passageways 110 are generally present in various gas turbine components, such as the example blade 84, to allow for the passage of cooling air. The array of internal passageways 110 may include one or more feed passages 112 that communicate airflow into the array of internal passageways 110 (FIG. 4). It should be appreciated that the array of internal passageways 110 may be of various geometries, numbers and configurations. The feed passage 112 generally receives cooling flow through at least one inlet 116 within a base 118 of the root 88. As gas turbine temperatures have increased, the geometries of these cooling passages have become progressively more circuitous and complex. Although particular features are delineated, the features may be otherwise arranged or intermingled and still not depart from the disclosure herein.

In this embodiment, the non-gas path side 122 of the platform 90 includes a slurry diffusion coating 130. The slurry diffusion coating 130 processing is particularly applicable to such an under-platform coating, as the slurry diffusion coating 130 can be readily applied into the deep pockets 95 (FIG. 3) of the platform 90 via spray or dip application methods. Such application methodology offers advantages over overlay coatings which may not achieve desired thicknesses. The diffusion coating 130 also does not require peening, so plugging cooling holes such as cooling holes 93 (FIG. 3) in the platform 90 with peen media is not a concern.

Although the non-gas path side 122 will be described as the localized area of application, other localized areas of other hot section components including, but not limited to, vanes, turbine shrouds, combustor panels, and other components will also benefit herefrom.

Figure 5:
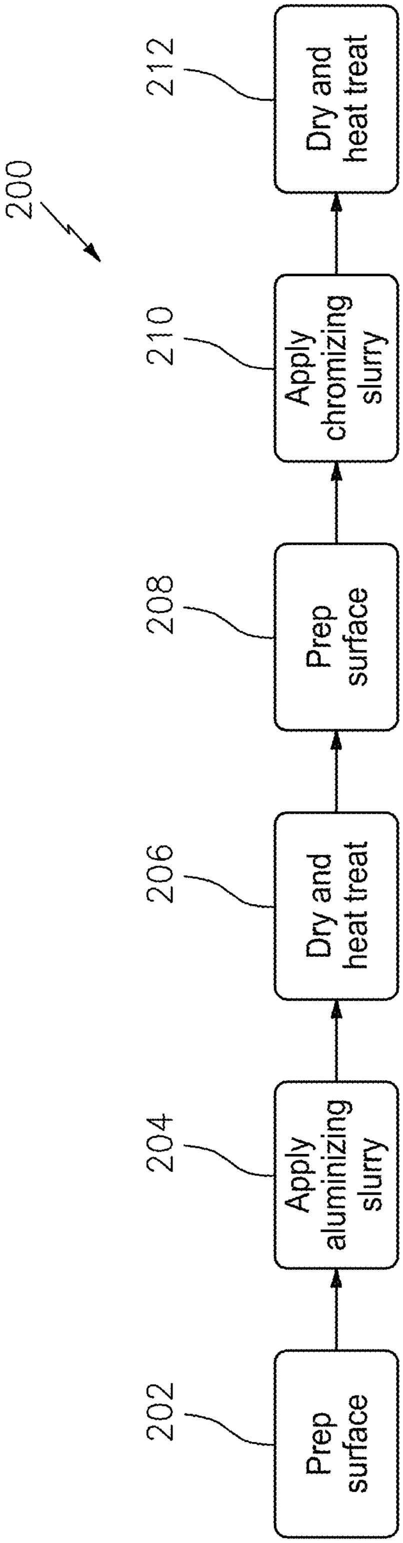
FIG. 5 is a block diagram representing a method of coating an under platform region with a diffusion coating.

With reference to FIG. 5, one disclosed non-limiting embodiment of a method 200 for applying the diffusion coating 130 is illustrated. Although the non-gas path side 122 adjacent to the root 88 is illustrated as the localized area of application upon which the diffusion coating 130 is applied in the disclosed embodiment, the article may be any metallic article formed of the base alloy substrate. The steps or actions described with respect to the method 200, can be employed with additional steps or other processes as desired. The diffusion coating 130 generally involves the application of two slurries, each with a heat treatment step, resulting in a Cr-rich NiCoCrAl diffusion coating which has been shown to be resistant to hot corrosion over the temperature range of interest for under-platform applications.

Initially, the first step of the process 200 may include surface preparation (202). The surface preparation may include, for example, a grit blast.

The next step is application of an aluminizing slurry (step 204) to the localized area of application, e.g., the non-gas path side 122 of the platform 90. As the desired localized area of application is readily achieved, the gas path side 124 of the platform 90 may be untreated. Alternatively, other areas or the entire component may be aluminized.

The aluminizing slurry, in terms of material, may include a slurry that includes an aluminum source, an activator, and an inert filler suspended in a slurry. The aluminum source may include chromium-aluminum alloys but other aluminum-based alloys that use an activator such as chromium chloride may alternatively be utilized. Also, the inert filler material such as aluminum oxide is utilized and suspended in the slurry such that the selected portion of the turbine blade 84 is sprayed therewith. The aluminum or aluminum source and activator can be combined with another material such as aluminum oxide powder and a binder to form a slurry prior to being deposited on the component. The other material can enhance the deposition of aluminum. The aluminizing slurry may, in one example in terms of weight percentage of solids, include 70% $Al_2O_3$, 5% halide activator, and 25% Al source material. This mixture may be suspended in the liquid binder at a solids loading of, for example, approximately 50% by weight. The aluminizing slurry forms a low-viscosity fluid capable of being flowed or sprayed. In one example, the aluminizing slurry has a viscosity of 100-200 cp, and is applied at ambient temperature and pressure.

Next, the aluminizing slurry is dried and heat treated (206). The aluminizing slurry may be dried to evaporate the flowable carrier component (e.g., flowable organic solvents or water), leaving the binder that binds the particles together. The aluminizing slurry may be permitted to dry at room temperature or heated to a moderate temperature to facilitate drying of the slurry. In one example, drying may be performed at 200 F (93 C) for 1 hour or performed at room temperature given a commensurate greater time period.

Next, the dried aluminizing slurry is heat treated, as still represented by step 206 in FIG. 5. In this embodiment, the heat treatment is in the range of 1900-2000 F (1038-1093 C) for 2-5 hours. This is a relatively short cycle at relatively high temperatures such that the aluminide may be referred to as a low activity high temperature aluminide. In other words, the heat treatment is done at relatively high temperature and the aluminide slurry is a low activity aluminizing slurry. The heat treating may be performed in an inert (e.g., argon) or reducing (e.g., hydrogen) atmosphere. In the case of the inert atmosphere, the atmosphere is largely free of oxygen and oxygen-containing species such as water vapor.

The heat treatment of the aluminizing slurry forms a crust that may require removal via further surface preparation (208). The preparation of the heat-treated aluminizing slurry may be, for example, a light grit blast as preparation for application of the chromizing slurry (210).

The chromizing slurry, in terms of the material, may include pure chromium as the chromium source, a halide as an activator such as chromium chloride or other chlorides and fluorides, an oxide filler such as $Al_2O_3$, and an organic binder. Using a slurry with no oxide filler is also an option. The chromizing slurry, may in one example in terms of weight percentage of solids, include 24% by weight chromium powder, 1% by weight chromium chloride ($CrCl_3$) particles, and 75% $Al_2O_3$ filler. This mixture may be suspended in the liquid binder at a solids loading of, for example, approximately 50% by weight. The resultant chromizing slurry forms a low-viscosity fluid capable of being flowed or sprayed. In one example, the slurry has a viscosity of 100-200 cp, and is applied at ambient temperature and pressure. Any operable organic binder may be used. Examples include, but are not limited to, B4 (n-propyl bromide-based organic binder such as that from Akron Paint and Varnish) and Klucel H (hydroxypropyl cellulose), and mixtures thereof. Aqueous binders may alternatively be utilized.

Application of the chromizing slurry (210) is then performed by processes include spraying, dipping or other processes such that local application is readily achieved.

Next, the chromizing slurry is dried and heat treated (212). The chromizing slurry is dried to evaporate the flowable carrier component of the organic binder (e.g., flowable organic solvents or water), leaving the binder that binds the particles together. Drying of the chromizing slurry drives off the carrier component at a relatively low temperature for short periods of time. In one example, drying of the binder is performed at 200 F (93 C) for 1 hour. Alternatively, the drying could be performed at room temperature given a commensurate greater time period.

Next, the chromizing slurry is heat treated. In one example, the heat treat may again be accomplished at fairly high temperatures between 1900-2000 F (1038-1093 C) but for an extended length of time such as 5-10 hours. The extended heat treatment time of the chromizing step facilitates formation of a desired microstructure (FIG. 6) of the diffusion coating.

Figure 6:
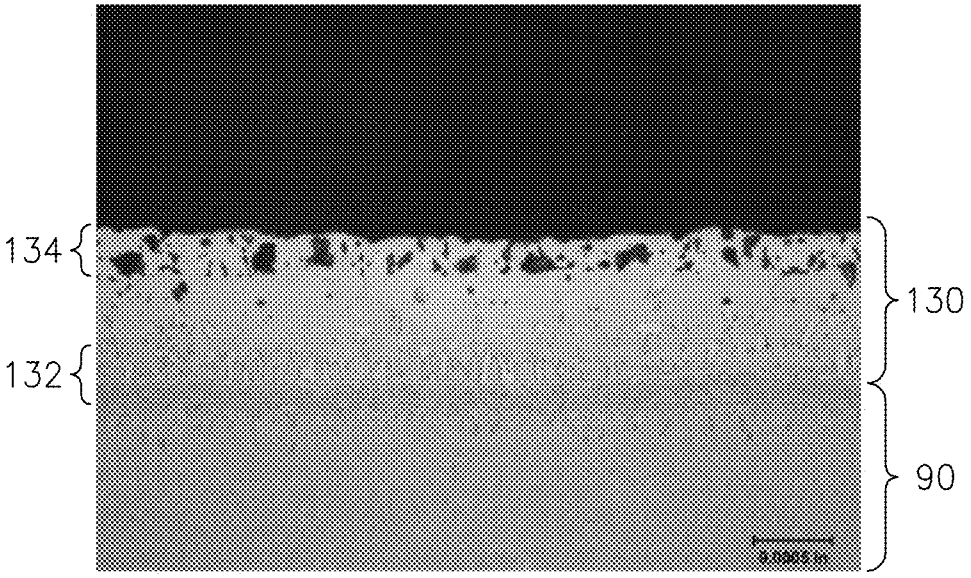
FIG. 6 is a micrograph of the diffusion coating.

With reference to FIG. 6, the microstructure of the diffusion coating 130 is identifiably different than that of an overlay coating. The diffusion coating 130 is not a stack of coatings, (i.e., not an aluminide with a chromide on top) but one in which the two individual coatings are not readily identifiable. The aluminide is applied first such that when the chromium is deposited, the chromium replaces the aluminum that is already present via an exchange reaction. That is, the chromium containing vapor impinges on the surface of the aluminide, reacts with aluminum to form volatile aluminum halide, and deposits Cr into the coating. Aluminizing prior to chromizing enriches the surface in aluminum, so there are more sites for this exchange reaction. The result is a higher chromium content coating than can be achieved with chromizing alone, with higher residual aluminum content.

The microstructure of the diffusion coating 130 includes an interface between the diffusion coating and the substrate that forms what is referred to herein as an inter-diffusion zone 132, in which are seen elongated refractory element-rich particles, which appear white in the microstructure. The microstructure of the diffusion coating 130 also includes non-metallic inclusions zone a zone of non-metallic inclusions 134 near the surface of the diffusion coating 130 which are seen in the micrograph as dark spots. These zones 132, 134 do not result from an overlay coating such that identification of the inter-diffusion zone 132 and the non-metallic inclusions zone 134 in a micrograph strongly indicates a diffusion coating.

The resulting diffusion coating 130 consists of an optional surface layer of α-Cr up to a thickness of approximately 5 microns, under which is a Cr-enriched γ-Ni based layer with a Cr content of 20 wt. % minimum and Al content of 4 wt. % minimum. Between this γ-Ni layer and the inter-diffusion zone 132, there may optionally be retained β-NiAl or γ'-Ni3Al from the initial aluminizing process. In this embodiment, the diffusion coating 130 is between 1-3 mils (thousandth of an inch (0.0254-0.0762 mm)) thick with a nominal thickness of 1.5 mils (thousandth of an inch (0.0381 mm)). The thickness is quite uniform across the entire of the localized area of application.

Slurry-based coating processing routes are promising for under-platform coatings, as they can be applied in deep pockets using relatively simple spray or dip application methods, offering an advantage over overlay coatings, which struggle to achieve desired thicknesses on some part geometries. The composition does not require peening, so plugging cooling holes with peen media is not a concern.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward", "aft", "upper", "lower", "above", "below" and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method of coating a component, comprising:

applying an aluminizing slurry to a localized area of a component;

drying the aluminizing slurry;

heat treating the aluminizing slurry;

applying a chromizing slurry to the localized area of the component subsequent to heat treating the aluminizing slurry;

drying the chromizing slurry; and heat treating the chromizing slurry so as to form a diffusion coating on the localized area of the component, the diffusion coating comprising an interdiffusion zone at an interface between the diffusion coating and the component, the diffusion coating further comprising a non-metallic inclusions zone adjacent to an outer surface of the diffusion coating, wherein the diffusion coating is a Cr-enriched γ-Ni based layer, and wherein the interdiffusion zone comprises elongated refractory element-rich particles, wherein Cr content and Al content are distributed through the diffusion coating such that a single diffusion coating layer contains the Cr content and the Al content.

2. The method as recited in claim 1, wherein the localized area is an under-platform area.

3. The method as recited in claim 1, further comprising a surface preparation subsequent to heat treating the aluminizing slurry.

4. The method as recited in claim 1, wherein the heat treating of the aluminizing slurry comprises heat treating for a length of time less than a length of time of the chromizing slurry.

5. The method as recited in claim 1, wherein the heat treating of the aluminizing slurry comprises heat treating in the range of 1900-2000 F for 2-5 hours.

6. The method as recited in claim 1, wherein the heat treating of the chromizing slurry comprises heat treating in the range of 1900-2000 F for 5-10 hours.

7. The method as recited in claim 1, wherein the heat treating of the aluminizing slurry comprises heat treating in the range of 1900-2000 F for 2-5 hours and heat treating of the chromizing slurry comprises heat treating in the range of 1900-2000 F for 5-10 hours.

8. The method as recited in claim 1, wherein the Cr-enriched γ-Ni based layer has a Cr content of 20 wt. % minimum and Al content of 4 wt. % minimum.

9. The method as recited in claim 1, wherein the diffusion coating has a thickness of between 1-3 mils (0.0254-0.0762 mm).

* * * * *